United States Patent Office 3,539,693
Patented Nov. 10, 1970

3,539,693
APPARATUS AND METHOD FOR REGULATING THE TEMPERATURE OF AN ELECTRICAL FURNACE
Werner Elischer, Erlangen, Germany, assignor to Siemens Aktiengesellschaft, a corporation of Germany
Filed June 28, 1968, Ser. No. 741,114
Claims priority, application Germany, July 1, 1967, S 110,633
Int. Cl. H05b 5/00
U.S. Cl. 13—26    13 Claims

ABSTRACT OF THE DISCLOSURE

Control apparatus comprising a control amplifier having a feedback path varies the electrical characteristics of the feedback path in accordance with the rate of variation of a control magnitude in the manner of a proportional regulator and changes to the manner of a proportional integral regulator upon a decrease in the rate of variation of the control magnitude.

DESCRIPTION OF THE INVENTION

The present invention relates to the regulation of control characteristics subject to inertia. More particularly, my invention relates to apparatus and a method for regulating control characteristics subject to inertia.

In the present disclosure, a proportional regulator is referred to as a P regulator, a proportional integral regulator is referred to as a PI regulator, and a proportional integral proportional regulator is referred to as a PIP regulator.

PI regulators are suitable for the rapid and complete elimination of control fluctuations. When a control characteristic is subject to inertia or a "dead" period relative to its dynamic behavior, a PI regulator causes over shooting of the control magnitude relative to a predetermined reference or datum value. Since the overshooting must be avoided under all circumstances, conventional PI regulators are not suitable for such uses. Thus, a PI regulator is unsuitable for use in controlling the temperature of a diffusion furnace utilized for doping semiconductors.

The principal object of the present invention is to provide new and improved apparatus and a method for regulating control characteristics subject to inertia.

An object of the present invention is to provide new and improved apparatus and a method for regulating the temperature of a furnace.

An object of the present invention is to provide new and improved apparatus and method for regulating the temperature of a diffusion furnace for doping semiconductors.

An object of the present invention is to provide apparatus and a method for regulating control characteristics subject to inertia without overshooting.

Another object of the present invention is to provide apparatus and a method for regulating control characteristics subject to inertia with efficiency, effectiveness and reliability.

In accordance with the present invention, apparatus for regulating control characteristics subject to inertia comprises controlled means having a variable characteristic. Control appartus connected to the controlled means controls the chartcteristic of the controlled means by a control magnitude in the manner of a proportional regulator and changes to the manner of a proportional integral regulator upon a decrease in the rate of variation of the control magnitude. The control apparatus comprises a control amplifier having a feedback path and an arrangement for varying the electrical characteristics of the feedback path in accordance with the rate of variation of the control magnitude.

In one embodiment of the invention, the control apparatus comprises a control amplifier having a feedback path comprising a resistor and a capacitor connected in series circuit arrangement with each other. The capacitor is resistively shunted in accordance with the rate of variation of the control magnitude. A high temperature resistive conductor shunts the capacitor. A heating winding heats the resistive conductor in accordance with the rate of variation of the control magnitude. The heating winding heats the resistive conductor in accordance with a heating voltage derived from the control magnitude via a differentiator.

In another embodiment of the present invention, a switch connects a shunt resistor in shunt with the capacitor of the feedback path in accordance with the rate of variation of the control magnitude. The switch is controlled in its conductive condition in accordance with a voltage derived from the control magnitude via a differentiator and a flip flop connected in series circuit arrangement with the differentiator to the switch.

In another embodiment of my invention, the control apparatus comprises a mechanical control amplifier having a mechanical feedback path. The mechanical characteristics of the feedback path are varied in accordance with the rate of variation of the control magnitude. The feedback path comprises a spring-coupled damping pot and an electromagnetic switch for controlling the operation of the damping pot in accordance with the rate of variation of the control magnitude. The damping pot comprises a cylinder. A piston is mounted for axial movement in the cylinder. A piston rod is affixed to the piston. The cylinder and the rod have apertures formed therethrough linearly in a determined position of the rod in the cylinder. A pin is controlled in position by the electromagnetic switch which positions the pin in one of two positions. In one position, the pin is spaced from the cylinder and rod. In the other position, the pin passes through the apertures through the rod and the cylinder thereby locking the damping pot in inactive condition. A mechanical-electrical transducer is subjected to the control magnitude and provides an electrical signal corresponding to the rate of variation of the control magnitude. A differentiator is connected to the transducer and a flip flop is connected in series circuit arrangement with the differentiator and the electromagnetic winding of the electromagnetic switch.

In accordance with the present invention, a method for regulating control chartcteristics subject to inertia comprises controlling a characteristic subject to inertia of a controlled unit by a control magnitude in the manner of a proportional regulator and changing to the manner of a proportional integral regulator upon a decrease in the rate of variation of the control magnitude.

A basic principle of my invention is thus the suppression of the integral operation of a PI regulator in accordance with the rate of variation of the control magnitude during the control period, so that the operation of the PI regulator becomes fully effective only when the rate of variation of the control magnitude is practically eliminated at the time said control magnitude approaches the reference or datum value. During a period of adjustment in which there is no overshooting, the aforementioned principle results in constancy of the control magnitude over a long period of time, as well as accuracy in control, and requires a small regulating period.

In order that the present invention may be readily carried into effect, it will now be described with reference to the accompanying drawings, wherein.

Figure 1:
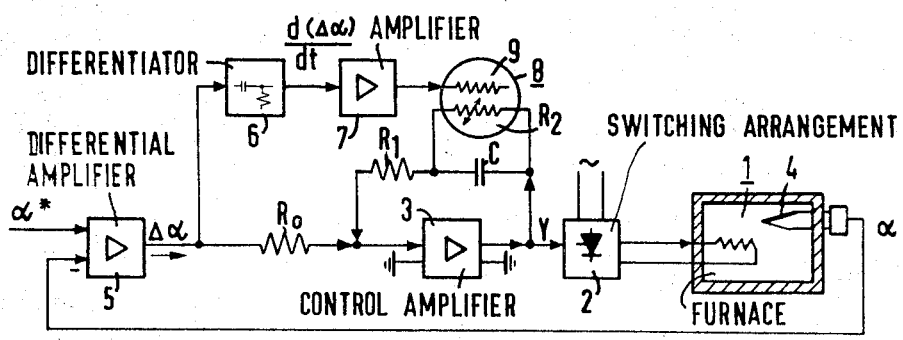
FIG. 1 is a circuit diagram of an embodiment of the apparatus of the present invention for regulating control characteristics subject to inertia.

FIG. 1 discloses apparatus for regulating the temperature of a furnace such as, for example, a diffusion furnace for doping semiconductors. A heating winding or coil is positioned within the furnace 1. The heating coil has a voltage applied to it via a phase-controlled switching arrangement 2. The switching arrangement 2 preferably comprises thyristors such as, for example, semiconductor controlled rectifiers. The voltage Y switched by the switching arrangement 2 is provided by a control amplifier 3.

A test value indicator 4 of any suitable type is suitably positioned in the furnace 1. The test value indicator 4 provides a signal $\alpha$ which is the pilot value of the temperature in the furnace 1. The test value indicator 4 may comprise, for example, a thermoelement.

The pilot magnitude $\alpha$ is supplied to an input of a differential amplifier 5. A reference or datum value or magnitude $\alpha^*$ is supplied to the other input of the differential amplifier 5. The reference or datum value $\alpha^*$ represents the desired temperature of the furnace 1. The differential amplifier 5 provides an output which is the control magnitude $\Delta\alpha$.

The control magnitude $\Delta\alpha$ is supplied to the control amplifier 3 via an input resistor $R_0$. The control magnitude $\Delta\alpha$ is also supplied to the input of an amplifier 7 via a differentiator 6. The differentiator 6 supplies to the amplifier a signal which is the rate of change of the control magnitude $\Delta\alpha$. Thus, the input signal to the amplifier 7 is $d(\Delta\alpha)/dt$. The amplifier 7 provides a voltage which is applied to a heating resistor 9 positioned in a high temperature conductor device 8.

When a voltage is applied to the resistor 9 of the high temperature conductor device 8, a high temperature resistive conductor $R_2$, which is positioned in said high temperature conductor device, is heated. The high temperature resistive conductor $R_2$ of the high temperature conductor device 8 has a high electrical resistance when it is not heated, due to no voltage being applied to the heating resistor 9 and has a low electrical resistance when it is heated due to the application of a voltage to the heating resistor 9.

The high temperature resistive conductor $R_2$ is connected in shunt across an integrating capacitor C. The integrating capacitor C is connected in series circuit arrangement with a resistor $R_1$ and said series circuit arrangement provides the feedback path of the control amplifier 3. When the high temperature resistive conductor $R_2$ is heated, so that it has a low electrical resistance, said high temperature resistive conductor short-circuits the integrating capacitor C. The heating of the high temperature resistive conductor $R_2$ corresponds to the rate of variation of the control magnitude $\Delta\alpha$. When the high temperature resistive conductor $R_2$ is not heated, so that it has a high electrical resistance, said resistive conductor does not effectively shunt the capacitor C. The feedback circuit C, $R_1$ of the control amplifier 3 thus varies in accordance with the rate of variation of the control magnitude $\Delta\alpha$, since such rate of variation determines the heating of the high temperature resistive conductor $R_2$ and thereby determines the shunting of the capacitor C.

Figure 2:
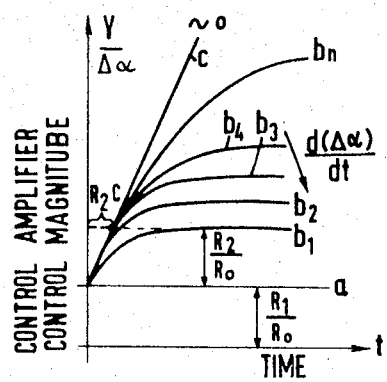
FIG. 2 is a graphical presentation of curves of the control magnitude of the control amplifier of FIG. 1.

In FIG. 2, the abscissa represents time $t$ and the ordinate represents the ratio of the control magnitude Y of the control amplifier 3 to the conrol magniude $\Delta\alpha$. The curves of FIG. 2 thus illustrate the time curves of the control magnitude Y during critical variations of the input signal to the control amplifier 3. The curves of FIG. 2 are for various resistance values of the high temperature resistive conductor $R_2$. At a very high rate of variation of the control magnitude, the resistance of the resistive conductor $R_2$ decreases substantially to zero, so that the control amplifier 3 functions as an almost perfect P regulator. The resistance of the resistive conductor $R_2$ is then a straight line $a$, as shown in FIG. 2, which is parallel to the abscissa, but displaced therefrom.

The ratio of the electrical resistance of the feedback resistor $R_1$ to the electrical resistance of the resistor $R_0$, as shown in FIG. 2, indicates the proportional amplification of the control amplifier 3. When the resistance of the resistive conductor $R_2$ increases, due to a decrease in the rate of variation of the control magnitude $\Delta\alpha$, the constant proportional magnitude $R_1/R_0$ is increased by an exponential function. The exponential function increases to a specific terminal value is determined by the magnitude of the resistance of the resistive conductor $R_2$. The resultant magnitudes are indicated by curves $b_1$ to $b_n$ of FIG 2.

The commencing increase of the curves $b_1$ to $b_n$ of FIG. 2 is constant and is determined by the magnitude $1/(R_0)(C)$. The control amplifier 3 thus functions as a PIP regulator. If the electrical resistance of the resistive conductor $R_2$ increases to the extent that it approaches infinity, the control amplifier 3 functions as a PI regulator, as shown by the curve $c$ of FIG. 2.

The regulating apparatus of FIG. 1 functions to provide a high voltage at the amplifier 7 when the furnace 1 is heated to its operational temperature, predetermined by the reference value $\alpha^*$. The high voltage provided at the amplifier 7 is due to the rapid rate of variation of the control magnitude $\Delta\alpha$. The high voltage at the amplifier 7 causes the heating resistor 9 of the high temperature conductor device 8 to heat the high temperature resistive conductor $R_2$ so that said resistive conductor has a low electrical resistance and therefore shunts the capacitor C. During this part of the operation, the circuit functions as a P regulator.

At an appropriate regulation or control of the proportional amplificatiton, an overshoot of the reference valve $\alpha^*$ will occur. The proportionality error, characteristic for each regulation of the proportional amplification, is thus evident. After such rough regulation, the rate of variation of the control magnitude $\Delta\alpha$ decreases and approaches zero. The high temperature resistive conductor $R_2$ is no longer heated and therefore has a very high electrical resistance. The capacitor C is then free of shunt and functions as an integrator, so that it gradually eliminates the proportional error in the usual manner of known PI regulators. The reference temperature is thus provided with considerable accuracy and is maintained at a constant level.

Figure 3:
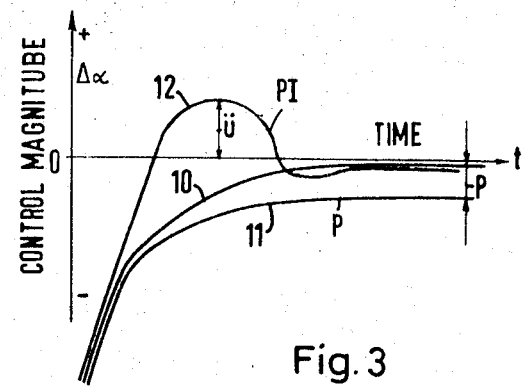
FIG. 3 is a graphical presentation illustrating the regulating operation of a proportional regulator and a proportional integral regulator.

In FIG. 3, the abscissa represents time $t$ and the ordinate represents the control magnitude $\Delta\alpha$. The curves of FIG. 3 illustrate the regulation operation. The aforedescribed regulating operation, performed by the apparatus of the present invention, is illustrated by the curve 10 of FIG. 3. The curve 11 illustrates an ideal P regulation operation. The curve 12 of FIG. 3 illustrates the operation of a PI regulator. As shown in FIG. 3, the control magnitude overshoots the reference value $\alpha^*$ by a magnitude U. It is thus seen that, in accordance with my invention, the I regulatiton is suppressed in accordance with the rate of variation of the control magnitude, and the P and I regulations are combined, in accordance with the rate of variation of the control magnitude, to provide the advantages of both types of regulation by eliminating the shortcomings of each.

The embodiment of FIG. 1 functions to provide a continual transition of P to PI regulation of the control amplifier 3 during the period of regulatiton. The continual smooth transition eliminates any abrupt transition from P to PI regulation. The P regulation at the commencement of the regulation period is changed to a PIP regulation during the regulation period, and at the termination of the regulation period the operation is as a PI regulator. This eliminates permanent control variations.

Figure 4:
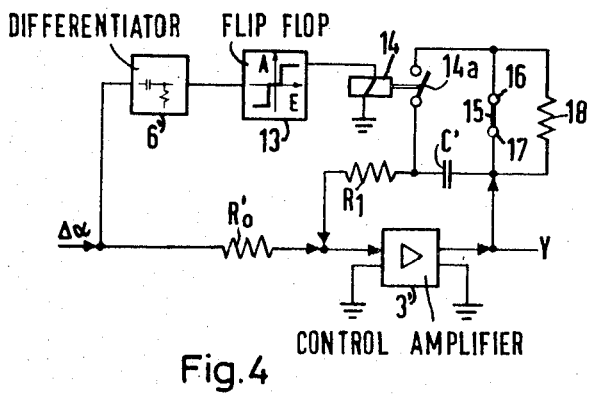
FIG. 4 is a circuit diagram of another embodiment of part of the apparatus of the present invention for regulating control characteristics subject to interta.

FIG. 4 illustrates another embodiment of the feedback path shunting arrangement of the apparatus of the present invention. In the embodiment of FIG. 4 the control magnitude $\Delta\alpha$ is supplied to the input of the control amplifier 3' via the resistor $R'_0$ and is also supplied to the input of a flip flop 13 via the differentiator 6'. The flip flop 13 is a three-point flip flop which normally produces no signal, but will produce a signal at one or the other of its outputs in response to different input conditions. The curve of the output voltage A relative to the input voltage E of the flip flop 13 is illustrated in the block representing such flip flop. A switch 14 is controlled in its conductive condition by a voltage provided by the flip flop 13, which voltage is derived from the control magnitude $\Delta\alpha$. The switch 14 may comprise any suitable switch such as, for example, an electronic, a magnetic or an electromagnetic switch, although a relay is illustrated in FIG. 4 as the switch 14.

Upon the commencement of the regulation operation, the output voltage of the differentiator 6', which is proportional to the rate of variation of the control magnitude $\Delta\alpha$, exceeds the response level of the flip flop 13. The switch 14 is thereby actuated and causes the closing of an electrical contact 14a. When the electrical contact 14a is closed, the capacitor C' of the feedback path of the control amplifier 3' is shunted. The control amplifier 3' then functions as a P regulator.

When the control magnitude $\Delta\alpha$ approaches the reference value of magnitude, the rate of variation of said control magnitude decreases to a value which is below the response level of the flip flop 13. The switch or relay 14 is then deenergized so that the electrical contact 14a opens. The control amplifier 3' then operates as a PI regulator. If the control amplifier 3' shall not operate as an ideal P regulator, as in the embodiment of FIG. 1, but rather as a PIP regulator, the electrical contact 15 between terminals 16 and 17 of the shunt circuit may be deleted and the resistor 18 may replace said contact.

Figure 5:
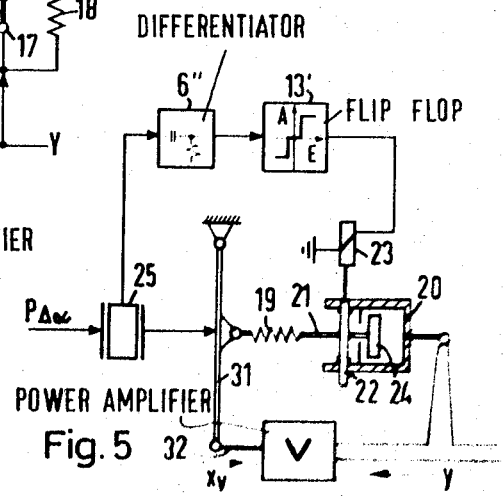
FIG. 5 is a circuit diagram of still another embodiment of part of the apparatus of the present invention for regulating control characteristics subject to inertia.

FIG. 5 is an embodiment of a mechanical regulator. In FIG. 5, a power amplifier V functions as a PI regulator due to a mechanical feedback path. The mechanical feedback path comprises a spring-coupled damping pot 20. A coupling spring 19 is connected at one end to a piston rod 21 of a piston 24 of the damping pot 20. The other end of the spring 19 is connected to a pivotal support on a pivotally mounted bar 31. One end of the bar 31 is pivotally mounted in any suitable manner, and the other end of said bar is pivotally coupled to the power amplifier V via a linking bar 32.

Apertures are formed through the piston rod 21 and the cylinder of the damping pot 20 in a manner whereby such apertures are linearly arranged in a determined position of said rod in said cylinder. A pin 22 is controlled in position by an electromagnetic switch 23. The switch 23 positions the pin 22 in either of two positions. In one position, when the electromagnetic switch 23 is deenergized, the pin 22 passes through the apertures through the rod 21 and the cylinder of the damping pot 20 and thereby locks said damping pot in an inactive condition. The piston rod 21 cannot then move relative to the cylinder. In the other position, the pin 22 is spaced from the cylinder and the piston rod 21 of the damping pot 20 and does not affect the operation of said damping pot. In such other position, the electromagnetic switch 23 is energized.

The positioning of the pin 22 thus determines the operation of the apparatus as a P regulator or a PI regulator. When the pin 22 is spaced from the damping pot 20 and does not influence its operation, the power amplifier V functions as a PI regulator. When the pin 22 locks the piston rod 21 in position in the cylinder of the damping pot 20, the power amplifier V functions as a P regulator. The pin 22 may be mechanically linked to the electromagnetic switch 23 or may be magnetically linked thereto.

The energization of the electromagnetic switch 23 is analogous to the operation of the embodiment of FIG. 4. The control magnitude $P\Delta\alpha$ is a mechanical force and is converted to a corresponding electrical voltage by a mechanical-electrical transducer 25. The mechanical-electrical transducer 25 may comprise any suitable device for converting a mechanical force to an electrical signal such as, for example, a piezoelectric crystal device. The control magnitude $P\Delta\alpha$ is also supplied to the bar 31 via the transducer 25.

The electrical signal provided by the transducer 25 is supplied to the input of a flip flop 13' via a differentiator 6''. The differentiator 6'' is identical to the differentiators 6 and 6' and functions in the same manner, and the flip flop 13' is identical with and functions in the same manner as the flip flop 13. The embodiment of FIG. 5 is utilized when the control magnitude is a power or mechanical force.

The apparatus and method of the present invention are advantageously utilized wherever the utilization of a conventional PI regulator would make possible an overshoot of the control magnitude above the reference value. The apparatus and method of the present invention are not limited to temperature control in a furnace, which temperature control has been utilized herein for illustrative purposes. The apparatus of the present invention may thus be advantageously utilized in pre-adjusted drives such as, for example, machine tool control.

While the invention has been described by means of specific examples and in specific embodiments, I do not wish to be limited thereto, for obvious modifications will occur to those skilled in the art without departing from the spirit and scope of the invention.

I claim:
1. Apparatus for regulating the temperature of an electrical furnace with regard to a reference value, said furnace being subject to thermal inertia, said apparatus comprising
an electrical furnace having a variable temperature characteristic;
first means to adjustably supply power to said furnace;
second means to sense the temperature of said furnace;
control means connected to said second means for controlling the output of said first means by a deviation from the reference value in the manner of a proportional regulator and changing to the manner of a proportional integral regulator upon a decrease in the rate of variation of said deviation.

2. Apparatus as claimed in claim 1, wherein said control means comprises a control amplifier having a feedback path and means for varying the electrical characteristics of said feedback path in accordance with the rate of variation of said deviation.

3. Apparatus as claimed in claim 1, wherein said control means comprises a control amplifier having a feedback path comprising a resistor, and a capacitor connected in series circuit arrangement with each other and shunting means for resistively shunting said capacitor in accordance with the rate of variation of said deviation.

4. Apparatus as claimed in claim 1, wherein said control means comprises a control amplifier having a feedback path comprising a resistor and a capacitor connected in series circuit arrangement with each other and shunting means for resistively shunting said capacitor in accordance with the rate of variation of said control magnitude, said shunting means comprising a high temperature resistive conductor shunting said capacitor and heating means for heating said resistive conductor in accordance with the rate of variation of said deviation.

5. Apparatus as claimed in claim 1, wherein said control means comprises a control amplifier having a feedback path comprising a resistor and a capacitor connected in series circuit arrangement with each other and shunting means for resistively shunting said capacitor in accordance with the rate of variation of said deviation, said shunting means comprising a shunt resistor and switching means for directly shunting said capacitor or for connecting said shunt resistor in shunt with said capacitor in accordance with the rate of variations of said deviation.

6. Apparatus as claimed in claim 1, wherein said electrical furnace comprises a diffusion furnace for doping semiconductors.

7. Apparatus as claimed in claim 1, wherein said control means comprises a mechanical control amplifier having a mechanical feedback path and means for varying the mechanical characteristics of said feedback path in accordance with the rate of variation of said deviation.

8. Apparatus as claimed in claim 1, wherein said control means comprises a mechanical control amplifier having a feedback path comprising a spring-coupled damping pot and electromagnetic switching means for controlling the operation of said damping pot in accordance with the rate of variation of said deviation.

9. Apparatus as claimed in claim 3, wherein said electrical furnace comprises a diffusion furnace for doping semiconductors.

10. Apparatus as claimed in claim 4, wherein the heating means of said shunting means comprises heating means for heating said resistive conductor in accordance with a heating voltage derived from said deviation and means for deriving a heating voltage from said deviation including differentiating means.

11. Apparatus as claimed in claim 5, wherein the switching means of said shunting means is controlled in its conductive condition in accordance with a voltage derived from said deviation and means for deriving a voltage from said deviation including differentiating means and flip flop means connected in series circuit arrangement with said differentiating means to said switching means.

12. Apparatus as claimed in claim 8, wherein said damping pot comprises a cylinder, a piston mounted for axial movement in said cylinder and a piston rod affixed to said piston, said cylinder and said rod having apertures formed therethrough linearly in a determined position of said rod in said cylinder and further comprising a pin controlled in position by said electromagnetic switching means which positions said pin in one of two positions, in one of which two positions said pin is spaced from said cylinder and rod and in the other of which positions said pin passes through the apertures through said rod and said cylinder thereby locking said damping pot in inactive condition.

13. Apparatus as claimed in claim 12, wherein said electromagnetic switching means comprises mechanical-electrical transducer means subjected to said deviation, said transducer means providing an electrical signal corresponding to the rate of variation of said deviation at an output thereof, differentiating means connected to said output of said transducer means, an electromagnetic winding and flip flop means connected in series circuit arrangement with said differentiating means and said winding.

References Cited
UNITED STATES PATENTS

| | | | |
|---|---|---|---|
| 2,829,231 | 4/1958 | Troost | 13—26 X |
| 3,107,285 | 10/1963 | Knapp | 219—210 X |
| 3,055,959 | 9/1962 | Vaughan | 13—26 |

BERNARD A. GILHEANY, Primary Examiner

R. N. ENVALL, JR., Assistant Examiner